United States Patent [19]
Struckman et al.

[11] 4,250,907
[45] Feb. 17, 1981

[54] FLOAT VALVE ASSEMBLY

[76] Inventors: Edmund E. Struckman, 46 Charles Henwood Ave., Southridge, Durban; Harold S. Larsen, 27B Northcliffe Ave., Westville Durban, both of South Africa

[21] Appl. No.: 970,978

[22] Filed: Dec. 19, 1978

[30] Foreign Application Priority Data

Oct. 9, 1978 [ZA] South Africa ............... 78/5708

[51] Int. Cl.³ .................. F16K 21/18; F16K 31/18
[52] U.S. Cl. .................... 137/1; 137/404; 137/443
[58] Field of Search ............ 137/404, 406, 434, 438, 137/442, 443, 1

[56] References Cited

U.S. PATENT DOCUMENTS

| 513,474 | 1/1894 | Bate | 137/404 |
| 947,106 | 1/1910 | Kirk | 137/443 |
| 2,214,792 | 9/1940 | Klotz | 137/404 |
| 2,439,282 | 4/1948 | Beckett | 137/443 |
| 2,613,686 | 10/1952 | Parson | 137/404 |
| 3,083,724 | 4/1963 | Johnson | 137/404 |
| 3,522,013 | 7/1970 | Borgeson | 137/430 |

FOREIGN PATENT DOCUMENTS

69/0796  8/1968  South Africa .
72/1476  3/1972  South Africa .
1535887 12/1978 United Kingdom ............... 137/437

Primary Examiner—Martin P. Schwadron
Assistant Examiner—G. L. Walton
Attorney, Agent, or Firm—Young & Thompson

[57] ABSTRACT

For ensuring a quick cut-off of a float controlled valve, there is provided a float having a buoyant body and a receptacle for liquid on the body, a single first tube providing an inlet to and an outlet from the receptacle, and a second tube connected to the first tube at an angle directed towards the interior of the receptacle to permit a portion of the liquid from the valve to flow through the second tube into the receptacle to bias the float downwardly and therefore the valve to its maximum open position, the direction of flow of liquid from the second into the first tube acting to dam any liquid in the receptacle. When the valve approaches its closed position, the flow through the second tube decreases and liquid flows out of the receptacle so removing the bias on the float and allowing the float rapidly to rise and close the valve.

7 Claims, 4 Drawing Figures

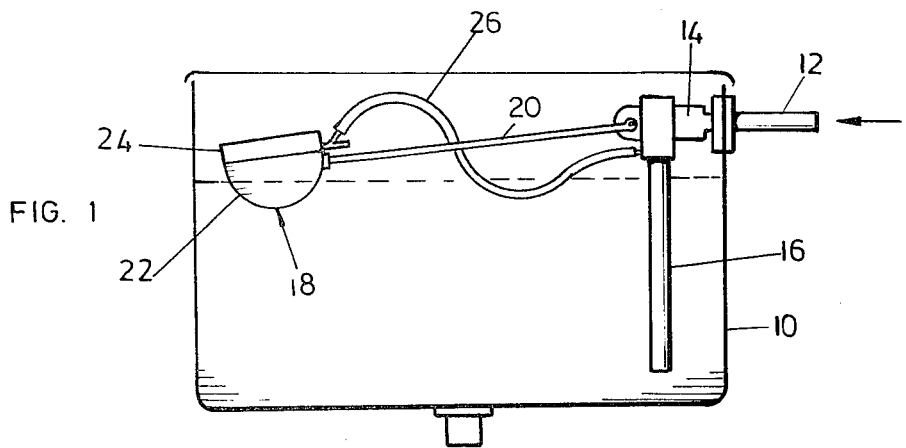
FIG. 1
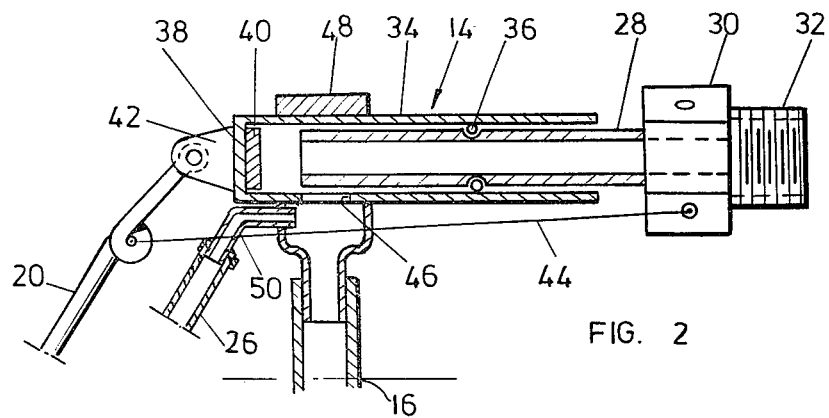
FIG. 2
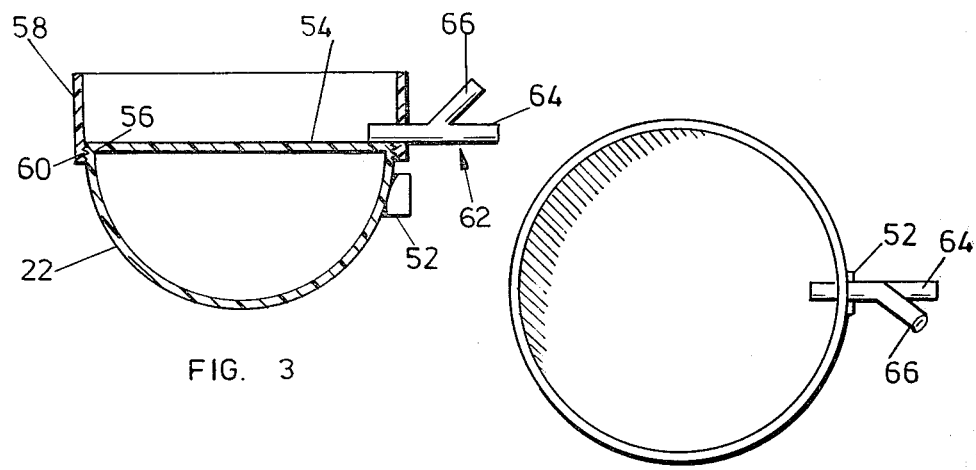
FIG. 3
FIG. 4

FLOAT VALVE ASSEMBLY

BACKGROUND TO THE INVENTION

This invention relates to a float and is particularly concerned with a float for a float controlled valve.

Float controlled valves are used in many applications for controlling the level of a liquid in a receptacle or reservoir. In practice, when the liquid level drops the float also drops and causes a valve to which it is attached by a lever arm to open so allowing the liquid to be replenished. As the liquid is replenished the valve progressively closes until it is fully closed when the predetermined level is reached. As will be appreciated when the valve closes progressively, the flow of liquid is restricted and the last stage of replenishing of the liquid takes considerable time. With conventional lavatory cisterns it usually takes at least five minutes to replenish the cistern after the lavatory has been flushed; most of this replenishing time is occupied by the final 10 or 20% of liquid flowing into the cistern.

It is an object of this invention to provide a float for a float controlled valve which ameliorates the above-mentioned problems in a reasonably satisfactory manner.

SUMMARY OF THE INVENTION

According to the invention there is provided a float for a float controlled valve, the float comprising a body adapted to be buoyant in a liquid, a receptacle formed on the top of the body, a first pipe extending through a wall of the receptacle in a lower region thereof and forming at one end an inlet in the receptacle and at the other end an outlet outside the receptacle, and a second pipe connected to the first pipe and forming with the first pipe an acute angle the apex of which is directed towards the inlet of the first pipe.

Suitably the acute angle is between 30° and 60° and, preferably, is approximately 45°.

Conveniently the buoyant body is a segment of a sphere with a substantially planar surface at the intersecting plane of the segment and the receptacle is formed by a cylindrical sleeve which engages the periphery of the body adjacent the substantially planar surface.

The first pipe is of sufficiently large diameter that it will not be easily blocked in use. Conveniently the diameter of the first pipe is approximately 6 mm.

According to another aspect of the invention there is provided a liquid level control apparatus including a valve connectable to a supply of the liquid, a float connected to the valve by a lever arm so that the valve can move automatically between a maximum open position and a closed position in dependence on the level of liquid to be controlled as the float moves on the liquid, the float being suitably constructed as described above according to the invention, and a tube connected between an outlet from the valve which is controlled by the float and the second pipe, whereby when the liquid level drops the float drops and the valve is opened to cause at least a portion of the liquid flowing through the valve to enter the receptacle of the float and bias the float downwardly and therefore the valve towards its maximum open position, while when the liquid level approaches a predetermined level the valve closes partially so that the flow of liquid into the receptacle decreases and liquid commences flowing out of the receptacle and the bias on the float is removed whereby the float rapidly rises to a predetermined position and closes the valve.

According to yet another aspect of the invention there is provided a method of controlling a liquid level control valve actuated by a float that is buoyant on a liquid, the level of which is to be controlled, including the steps of forming a receptacle for the liquid on the float; forming a single fluid path into and out of the receptacle; causing liquid to flow into the receptacle when the valve is opened to bias the float downwardly, with the liquid flow being arranged to dam the liquid in the receptacle; and permitting the flow of liquid to decrease when the liquid level approaches a predetermined level so that liquid in th receptacle may flow out therefrom to remove the bias on the float allowing the float to rise and to cause the valve to close rapidly.

Further features and advantages of the invention are set out in the appended claims and will become apparent from the following description made with reference to the drawing.

BRIEF DESCRIPTION OF THE DRAWING

FIG. 1 shows a schematic side elevation of a lavatory cistern including a liquid level control valve apparatus according to the invention;

FIG. 2 shows a liquid level control valve, partly in section, in greater detail;

FIG. 3 shows a side view of a float according to the invention; and

FIG. 4 shows a plan view of the float of FIG. 3.

DESCRIPTION OF A PREFERRED EMBODIMENT

FIG. 1 shows a lavatory cistern 10 which is supplied with replenishing water through a pipe 12 and a control valve 14, the control valve 14 having an outlet pipe 16, and a float 18 connected to the valve 14 by lever arm 20 for actuating the valve. The float 18 includes a buoyant body 22 and a receptacle 24 on the body 22 and a tube 26 connected between the outlet pipe 16 of the valve 14 and the receptacle 24.

FIG. 2 shows the valve in greater detail. The valve 14 includes a fixed, hollow, piston 28 provided with a hexagonally shaped boss 30 and a threaded coupling portion 32 so that the piston can be secured to the walls of the cistern 10 and be connected to a water supply pipe. The valve 14 further includes a cylinder 34 that is slidable on the piston 28 and sealed thereto by an O-ring 36 and has one end 38 closed. Adjacent the closed end 38 is a disc 40 of sealing material so that when the end of the cylinder 38 is forced against the end of the piston 28 the disc 40 forms a seal. The cylinder carries a bracket 42 to which the lever arm 20 is pivotally secured. At a position offset from the pivotal connection of the lever arm 20 to the bracket 42 a pivotal connection is formed between a linkage 44 and itself and the linkage 44 is also pivotally connected to the boss 30. The cylinder is formed with an outlet hole 46. Engaged with the cylinder 34 and in communication with the outlet hole 46 is a connection member 48 so that a sealed fluid path is formed between the interior of the piston 28, the outlet hole 46 of the cylinder and the outlet pipe 16. A short pipe 50 is connected into the connecting member 48 so that the tube 26 can be connected to the outlet path of the valve 14. FIGS. 3 and 4 show the float 18 of FIG. 1 in greater detail. The float includes a hemisphrecial blown plastics buoyant body 22 that is provided with an internally threaded stud 52 so that the float may be threadably engaged with the lever arm 20. The upper surface 54 of the float is substantially planar and the periphery of this surface is formed with ribs 56. A cylindrical sleeve having complimentary ribs 60 is engaged with the spherical shell member 22 in a liquid tight manner. A 45° junction member 62, including a first pipe 64 and a second pipe 66 at 45° to the first pipe is fitted into the sleeve 58 at a position immediately adjacent the planar portion 54.

In use, when the cistern is flushed the float 18 drops with the falling level of the water and causes the valve 14 to open to its maximum position so that the cistern is replenished from the main supply. At the same time a portion of the water issuing from the outlet of the valve 14 passes along the tube 16 through the second pipe 66 and the first pipe 64 into the receptacle 24. As will be appreciated the angle which the pipe 66 makes with the pipe 64 is such that the direction of fluid flow is into the receptacle and at the same time this inflowing fluid forms a dam preventing liquid already in this receptacle from coming out of the pipe 64. For this reason the receptacle fills rapidly and the additional weight on the float biasses the float downwardly so that the valve 14 is biassed towards its maximum open position. As the cistern fills rapidly because of the opening of the valve 14 the float 18 rises towards the maximum predetermined level. As the float approaches the maximum predetermined level the valve 14 closes progressively and a stage is reached at which the pressure of water in the receptacle 24 is greater than the pressure of fluid flowing through the pipe 66 into the pipe 64. Thus liquid starts flowing out of the receptacle so removing the bias on the float. The float therefore rises causing the valve 14 to close further and the rate of flow of liquid out of the receptacle is further increased. Accordingly, the float then rises rapidly to its maximum predetermined level at which stage the valve 14 is closed. Tests have shown that with a conventional liquid level control valve apparatus a cistern has taken between 5 and 6½ minutes to fill. The same apparatus, except using the float of the invention took 95 seconds to fill. Although the movement of the float from a slightly open position to the closed position is rapid, this movement is smooth so that there is no water hammer in the water supply pipes.

An advantage of the invention is that a large diameter inlet and outlet is used for the receptacle 24. This ensures that the inlet/outlet does not become blocked.

We claim:

1. A float for a float controlled valve, the float comprising a body adapted to be buoyant on a liquid, a receptacle formed on the top of the body, a combined inlet/outlet channel unit comprising a first pipe open at both ends and extending through a wall of the receptacle in a lower region thereof and forming at one end an inlet in the receptacle and at the other end an outlet outside the receptacle, and a second pipe having one end connected to the first pipe intermediate its ends and an opposite end adapted to be connected to a water feed conduit, the second pipe forming with the first pipe an acute angle the apex of which is directed towards the inlet of the first pipe.

2. A float as claimed in claim 1 in which the acute angle is between 30° and 60°.

3. A float as claimed in claim 1, in which the buoyant body is formed of a segment of a sphere with a substantially planar surface at the intersection plane of the segment and the receptacle is formed by a cylindrical sleeve a portion of which sealingly engages the periphery of the body adjacent the substantially planar surface, and the first pipe extends through the cylindrical sleeve immediately adjacent the planar surface.

4. A float as claimed in claim 1 in which the diameter of the first pipe is approximately 6 mm.

5. A liquid level control apparatus including a valve connectable to a supply of liquid; a float connected to the valve by a lever arm so that the valve can move automatically between a maximum open position and a closed position as the float moves vertically on the surface of the liquid, the float comprising a body adapted to be buoyant on the liquid, a receptacle provided on the top of the body; a combined inlet/outlet channel unit comprising a first pipe extending through a wall of the receptacle in a lower region thereof and forming at one end an inlet in the receptacle and at the other end an outlet outside the receptacle, and a second pipe connected to the first pipe and forming with the first pipe an acute angle the apex of which is directed towards the inlet end of the first pipe, and a tube connected between an outlet from the valve and the second pipe whereby when the liquid level drops the float drops and the valve is opened and at least a portion of the liquid flowing through the valve enters the receptacle of the float via the tube, the second pipe and the inlet formed by the first pipe and biasses the float downwardly and therefore the valve is biassed towards its maximum open position, while when the liquid level approaches a predetermined level the valve closes partially so that the flow of liquid into the receptacle decreases and liquid commences flowing out of the receptacle through the first pipe so removing the bias on the float and permitting the float rapidly to rise to a predetermined position and close the valve.

6. A method of controlling a liquid level control valve actuated by a float that is buoyant on a liquid the level of which is to be controlled, including the steps of forming a receptacle for the liquid on the float, forming a single fluid path into and out of the receptacle; causing liquid to flow from the valve into the receptacle through the fluid path when the valve is opened to bias the float downwardly, with the liquid flow being directed to dam any liquid in the receptacle when the liquid flow is above a predetermined rate; and permitting the flow of liquid to decrease when the liquid level approaches a predetermined level so that any liquid in the receptacle may flow out through said single fluid path to remove the bias on the float and allow the float to rise thereby to cause the valve to close rapidly.

7. A method as claimed in claim 6, in which liquid is allowed to flow into the receptacle by diverting at least a portion of the liquid flowing through the valve to the fluid path to the receptacle.

* * * * *